(12) United States Patent
Caulkins

(10) Patent No.: US 6,742,140 B2
(45) Date of Patent: May 25, 2004

(54) METHOD FOR USING VOLATILE MEMORY FOR LONG-TERM STORAGE

(76) Inventor: Jason R. Caulkins, 3118 Seminole Dr., Redding, CA (US) 96001

(*) Notice: Subject to any disclaimer, the term of this patent is extended or adjusted under 35 U.S.C. 154(b) by 581 days.

(21) Appl. No.: 09/728,537

(22) Filed: Dec. 1, 2000

(65) Prior Publication Data

US 2002/0078399 A1 Jun. 20, 2002

(51) Int. Cl.[7] .............................................. G06F 11/00
(52) U.S. Cl. .............................. 714/24; 714/22; 714/15
(58) Field of Search ................................ 714/5, 14, 22, 714/24

(56) References Cited

U.S. PATENT DOCUMENTS

| | | | |
|---|---|---|---|
| 3,916,390 A | 10/1975 | Chang et al. | 365/183 |
| 4,327,410 A | 4/1982 | Patel et al. | 711/162 |
| 4,458,307 A * | 7/1984 | McAnlis et al. | 714/22 |
| 4,525,800 A | 6/1985 | Hameria | 714/6 |
| 4,636,946 A | 1/1987 | Hartung | 395/463 |
| 4,779,189 A | 10/1988 | Legvold et al. | 395/493 |
| 4,916,605 A | 4/1990 | Beardsley | 395/489 |
| 5,241,508 A | 8/1993 | Berenguel et al. | 365/229 |
| 5,359,728 A * | 10/1994 | Rusnack et al. | 714/5 |
| 5,414,861 A * | 5/1995 | Horning | 365/229 |
| 5,515,333 A * | 5/1996 | Fujita et al. | 365/229 |
| 5,535,399 A | 7/1996 | Blitz et al. | 395/750 |
| 5,539,876 A * | 7/1996 | Saito et al. | 714/14 |
| 5,542,042 A * | 7/1996 | Manson | 714/2 |
| 5,555,402 A | 9/1996 | Tuma et al. | 395/500 |
| 5,650,974 A | 7/1997 | Yoshimura | 365/229 |
| 5,828,823 A * | 10/1998 | Byers et al. | 714/24 |
| 5,889,795 A | 3/1999 | Niijima et al. | 371/40.4 |
| 5,987,627 A | 11/1999 | Rawlings, III | 714/48 |
| 6,035,384 A | 3/2000 | Tuma et al. | 711/219 |
| 6,069,827 A | 5/2000 | Sinclair | 365/185.29 |
| 6,078,541 A | 6/2000 | Kitagawa et al. | 365/230.01 |
| 6,078,984 A | 6/2000 | Bubeck | 711/5 |
| 6,108,694 A | 8/2000 | Yashiro et al. | 709/216 |
| 6,108,792 A * | 8/2000 | Hanaoka | 713/323 |

(List continued on next page.)

FOREIGN PATENT DOCUMENTS

| | | |
|---|---|---|
| EP | 0614143 A2 | 9/1994 |
| EP | 0614143 A3 | 9/1994 |

OTHER PUBLICATIONS

Technical Brief entitled "Accelerating Database Performance with Platypus QikDATA™ Storage Devices", Apr. 2001, pp. 1–12.
Media Release entitled "Platypus Fast–Tracks International Plans After Splash of Venture Capital Funds", Oct. 16, 2000, (4 pages).
Media Release entitled "Platypus Pumps Citrix Server Performance", Oct. 3, 2000, (3 pages).
Press Release entitled "The Microsource Makes a Qik Splash with Platypus", Aug. 1, 2000, (5 pages).
User Guide entitled "QikDRIVE & QikCACHE", 1999, (24 pages).
User Guide entitled "QikDRIVE8", 1999, (47 pages).
Specification sheet for QikData (1 page).
Article entitled "QikDRIVE8" (1 page).
Article entitled "QikDRIVE8 Solid State Drives", (2 pages).

*Primary Examiner*—Nadeem Iqbal
*Assistant Examiner*—Tim Bonura

(57) ABSTRACT

A method for using volatile memory for data storage includes using volatile memory device back up systems to provide power to both the volatile memory and non-volatile memory in the event of power failure. The method also connects the volatile memory directly to an expansion bus of the host computer system, such as a PCI bus. Therefore, the method of the invention includes a high-speed path to the host computer system and the volatile memory devices designed using the methods of the invention are faster than prior art devices, use less power and are lower cost.

1 Claim, 10 Drawing Sheets

U.S. PATENT DOCUMENTS

| | | | |
|---|---|---|---|
| 6,115,787 A | 9/2000 | Obara | 711/113 |
| 6,115,798 A | 9/2000 | Hayasaka | 711/162 |
| 6,122,276 A | 9/2000 | Hunt et al. | 711/112 |
| 6,181,630 B1 | 1/2001 | Caulkins | 365/228 |
| 6,295,577 B1 * | 9/2001 | Anderson et al. | 711/113 |
| 6,304,981 B1 * | 10/2001 | Spears et al. | 714/24 |
| 6,341,354 B1 | 1/2002 | Lee | 713/324 |
| 6,473,355 B2 * | 10/2002 | Caulkins | 365/228 |

\* cited by examiner

METHOD FOR USING VOLATILE MEMORY FOR LONG-TERM STORAGE

CROSS REFERENCE TO RELATED PATENTS AND PATENT APPLICATIONS

This Application is related to: U.S. patent application Ser. No. 09/499,702, filed Feb. 7, 2000, entitled "METHOD OF STABILIZING DATA STORED IN VOLATILE MEMORY", and naming Jason R. Caulkins as inventor; and U.S. patent application Ser. No. 09/728,457, filed Nov. 20, 2000, entitled "APPARATUS FOR USING VOLATILE MEMORY FOR LONG-TERM STORAGE", and naming Jason R. Caulkins as inventor, all of which are assigned to the assignee of the present invention and are incorporated herein, in their entirety, by reference for all purposes.

FIELD OF THE INVENTION

The present invention relates generally to electronic data storage and, more particularly, to methods for long-term storage of data in volatile memory.

BACKGROUND OF THE INVENTION

Computer systems, regardless of manufacturer or size, typically employ at least the following fundamental components: a central processing unit (CPU); a display device; at least one user input device; and memory for data storage.

There are two basic classifications of memory: volatile memory and non-volatile memory. The primary difference between volatile memory and non-volatile memory is that a volatile memory needs to be supplied with external power in order to hold and refresh data while a non-volatile memory can maintain data for extended periods of time without any power being supplied to the device. Consequently, data stored in volatile memory are typically lost when power to the host computer system is removed or cut-off, while data stored in non-volatile memory are typically retained when power to the host computer system is removed or cut-off.

Most computer systems utilize both volatile and non-volatile memory in the same system or device. For instance, in a typical computer system, data intended for high-speed short-term access, such as on-chip memory for the CPU, and often first and second level off-chip memory, are typically stored in volatile memory devices such as a cache or random access memory (RAM, DRAM, SRAM etc.) which typically have nanosecond to microsecond access times. However, in the same computer system, data intended for long-term storage or "mass storage" are typically stored in non-volatile storage devices such as magnetic disks, hard disk drives, zip drives, floppy disk drives, tape drives and optical storage media which typically have access times on the order of milliseconds or seconds.

As discussed above, volatile memory devices typically have significantly faster access times and higher data transfer rates than non-volatile storage devices. This, coupled with the decreasing cost of volatile memory over the past few years, makes volatile memory devices more desirable than non-volatile storage devices for use with high-speed systems. One reason non-volatile storage devices are so much slower than volatile memory devices is that non-volatile storage devices, such as disk drives, typically have moving parts and mechanical components such as rotating hard disks, rotating optical disks, rotating floppy disks, optical or magnetic readers, floating heads, lasers, tape drives and tape.

The mechanical components associated with non-volatile storage devices are problematic for several reasons. First, mechanical components slow down data transfer significantly because no mechanical mechanism is capable of achieving data transfer rates approaching the speed of a pure signal transfer between electronic components, i.e., electrical signals travel faster than any mechanical device can move. Second, mechanical components are subject to friction and motion stress and, therefore, even the best components physically wear out and degrade over time. This fact creates a long-term reliability problem and virtually guarantees that parts will need to be replaced in the field. In addition, to overcome friction and other mechanical forces, mechanical components typically require more power and therefore use up power resources faster. This is particularly disadvantageous in the present market that stresses compact size, including smaller battery packs and power supplies, as well as portability, lightweight and extended operation capability.

For the reasons discussed above, non-volatile storage devices are typically slower, less reliable and need more power to function than volatile memory devices. In contrast to non-volatile storage devices, volatile memory devices typically do not employ any moving parts or mechanical components. Therefore, volatile memory devices are faster, more reliable and need less power for operation than non-volatile storage devices. Consequently, volatile memory devices are potentially more desirable than non-volatile storage devices and represent an appealing alternative to non-volatile memory for computer systems requiring highly reliable data access at high-speeds with minimal power used.

As discussed above, volatile memory has numerous advantages in terms of speed, reliability and power consumption over non-volatile memory and non-volatile storage devices. However, the vast majority of long-term memory devices used in the prior art were non-volatile storage devices such as hard disk drives, zip drives and optical media. This industry-wide use of non-volatile memory for long term storage, despite the potential advantages of volatile memory, is primarily the result of the fact that using prior art volatile memory devices for long-term data storage involved unacceptable inherent risks, slow transfer rates between the host computer system and the memory and the addition of significant equipment resulting in significant additional cost.

FIG. 1 shows a typical prior art sub-system 100. Prior art sub-system 100 includes: motherboard 110; host computer system power supply 101; DC power connector 112, coupling motherboard 110 to power supply 101; AC power connector 157, coupling commercial AC power from outlet 199 to host computer system power supply 101; DC power connector 103, coupling power supply 101 to a non-volatile storage device 105 (typically a hard disk drive or optical storage device); disk controller 109; and a single data cable 107 that facilitates the exchange of data between non-volatile storage device 105 and disk controller 109.

In prior art sub-systems, such as sub-system 100 of FIG. 1, when power to sub-system 100 was shut down in a controlled and orderly manner no data were typically lost. However, when power was cut-off to the computer system, for any reason, the volatile memory lost all its data. Thus, using prior art volatile memory devices: if power was cut-off to the computer system in an unplanned manner, such as the user inadvertently unplugging the computer system or, in the case of a laptop or other portable system, allowing the battery to run down, all the data were lost; if power was interrupted by a local power failure such as a blown fuse or circuit breaker, all the data were lost; or if power was interrupted by a major power failure at a relay station or other power company source, all the data in volatile memory were lost. Consequently, using prior art volatile memory devices for long term data storage meant running the risk that even a temporary interruption of power would mean losing data forever.

In some prior art systems, a standard disk bus was used in an attempt to back up volatile memory to a dedicated disk drive. These prior devices addressed some of the problems discussed above. However, since these prior art devices employed dedicated disks and used standard disks buses, the devices were typically expensive to employ and had relatively slow data transfer rates between the host computer system and the memory device.

What is needed is a method that allows a host computer system to use volatile memory as the storage media, i.e., allows use of volatile memory as if it were a disk drive. The method should also provide the stability and security of non-volatile memory and, ideally, connect to an expansion bus of the host computer system, such as a PCI bus, to provide a sub-system that is faster than prior art systems at a relatively low cost.

SUMMARY OF THE INVENTION

According to the principles of the present invention, volatile memory devices are provided that are used by the host computer system as the storage media, i.e., they are used as if it were a disk drive. The volatile memory devices of the invention include an integrated controller and volatile memory storage media.

The volatile memory devices of the invention also include volatile memory device back up systems to provide power to both the volatile memory and non-volatile memory in the event of power failure. In one embodiment of the invention, the non-volatile memory that is backed up by the volatile memory device power supply of the invention is a local disk that is normally available to the host computer system. Consequently, the volatile memory devices of the present invention provide long-term data storage capability without the risks associated with prior art devices.

In addition, the volatile memory devices of the invention connect directly to an expansion bus of the host computer system, such as a PCI bus. Therefore, the volatile memory devices of the invention include a high-speed path to the host computer system. Consequently, the volatile memory devices of the invention are faster than prior art devices, use less power and are lower cost.

According to the principles of the invention, a computer system includes at least one volatile memory device and at least one non-volatile storage device. Under normal operating conditions, external commercial power is supplied to the volatile memory device to maintain the data, and to the non-volatile storage device, for normal operation by a host computer system power supply and commercial power source.

According to the principles of the invention, in the event of commercial power source loss, long-term data retention is maintained by using a volatile memory device power supply and rechargeable battery back up and control logic to maintain power to both the volatile memory device and the non-volatile storage device and transfer data from the volatile memory device to the non-volatile storage device through a back up and restore process.

In addition, according to the principles of the invention, the volatile memory device connects directly to a host computer system expansion bus so that a high-speed data path is provided for moving information between the host computer system and the volatile memory device.

In one embodiment of the invention, the volatile memory storage media of the volatile memory device of the invention is used for long-term data storage and is provided with continuous power, even when the host computer system loses power or is turned off. When the host computer system has power and is turned on, the data stored in the volatile memory device of the invention are normally immediately available and accessible with data transfer rates significantly faster than prior art volatile or non-volatile storage devices.

In one embodiment of the invention, data are then read from and written to the volatile memory device during the normal use of the host computer system as if the volatile memory device of the invention were a disk drive. Consequently, the volatile memory device of the invention is used in the same manner that non-volatile storage devices, such as a disk drive, were used in the prior art. However, since, according to the invention, the long-term storage is performed by a volatile memory device, the data transfer rates are faster, reliability is increased and less operating power is consumed.

In one embodiment of the invention, the user may manually initialize a back up procedure at any time. Once initiated, the back up procedure transfers the entire contents of the volatile memory to a non-volatile storage device. When this process is finished, the data in volatile memory are again available for normal use, and the back up data are unchanged. As discussed above, in one embodiment of the invention, the loss of commercial power to the host computer system will initiate an automatic back up from the volatile memory to the non-volatile storage device.

In one embodiment of the invention, upon the loss of commercial power, i.e., when the power at the outlet becomes unavailable, power will be provided seamlessly from a rechargeable battery system coupled to the both volatile memory and the non-volatile storage device. In addition, in one embodiment of the invention, an automatic back up from the volatile memory to the non-volatile storage device will be initiated, an alarm condition will be indicated, and the device will be shut down in an orderly manner.

In one embodiment of the invention, when commercial power is restored to the host computer system and the volatile memory device of the invention, the volatile memory device of the invention will then automatically restore the data previously saved on the non-volatile storage device to the volatile memory. The data are then available for normal access.

In particular, one embodiment of the invention includes a method for using volatile memory for data storage in a host computer system. The method includes: providing a volatile memory storage media; providing a non-volatile storage device; providing a volatile memory device power supply to supply power to both the volatile memory storage media and the non-volatile storage device in the event of power loss to the host computer system; providing control logic to transfer data from the volatile memory storage media to the non-volatile storage device in the event of power loss to the host computer system; and coupling the volatile memory to the host computer system using an expansion bus of the host computer system.

As discussed in more detail below, the volatile memory devices of the invention are used by the host computer system as the storage media and include volatile memory device back up systems to provide power to both the volatile memory and non-volatile memory in the event of power failure. In addition, the volatile memory devices of the invention connect directly to an expansion bus of the host computer system, such as a PCI bus. Consequently, the volatile memory devices of the invention are faster than prior art devices, use less power and are lower cost.

The volatile memory devices of the invention can be also readily used in existing standard computer system architectures that typically already include both volatile and non-volatile storage devices. In one embodiment of the invention, existing local disk dives are used as the non-volatile storage device that is backed up by the volatile memory device power supply of the invention. Therefore, the volatile memory devices of the invention will significantly increase the speed and data transfer rate of long-term data storage in virtually any host computer system.

It will be apparent in the discussion that follows that the volatile memory devices of the invention are a low cost solution to the long-standing problem presented by slow data transfer rates of prior art storage devices.

It is to be understood that both the foregoing general description and following detailed description are intended only to exemplify and explain the invention as claimed.

BRIEF DESCRIPTION OF THE DRAWINGS

The accompanying drawings, which are incorporated in, and constitute a part of this specification, illustrate embodiments of the invention and, together with the description, serve to explain the advantages and principles of the invention. In the drawings.

DETAILED DESCRIPTION

Figure 1:
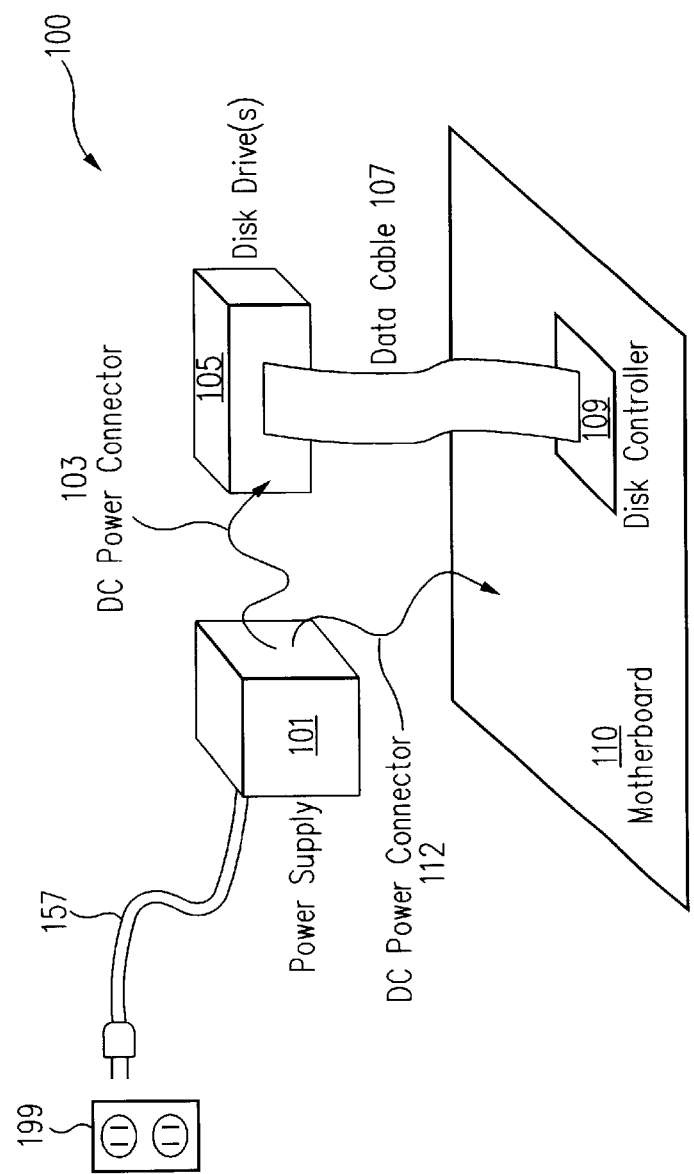
FIG. 1 shows a typical prior art sub-system.

The invention will now be described in reference to the accompanying drawings. The same or similar reference numbers may be used throughout the drawings and the following description to refer to the same or like parts.

According to the principles of the present invention, volatile memory devices (220 and 220A in FIGS. 2, 3A and 3B) are provided that are used by the host computer system (360 in FIGS. 3A and 3B) as the storage media, i.e., they are used as if it were a disk drive. The volatile memory devices of the invention (220 and 220A) include integrated control logic (305 in FIGS. 3A and 3B) and volatile memory storage media (303 in FIGS. 3A and 3B).

The volatile memory devices of the invention (220 and 220A) include volatile memory device power supply (301 in FIG. 3A) to provide power to both the volatile memory storage media (303) and non-volatile storage device (105 in FIGS. 1, 2, 3A and 3B) in the event of power failure. In one embodiment of the invention, the non-volatile storage device (105) that is backed up by the volatile memory device power supply (301 and 301C) of the invention is a local disk normally available to the host computer system (360). Consequently, the volatile memory devices of the present invention (220 and 220A) provide long-term data storage capability without the risks associated with prior art devices.

In addition, the volatile memory devices of the invention connect directly to a host expansion bus (309 in FIG. 3A and 309A of FIG. 3B) of the host computer system (360), such as a PCI bus. Therefore, the volatile memory devices of the invention (220 and 220A) include a high-speed path to the host computer system (360). Consequently, the volatile memory devices of the invention (220 and 220A) are faster than prior art devices, use less power and are lower cost.

According to the principles of the invention, a computer system includes at least one volatile memory device (220 and 220A) and at least one non-volatile storage device (105). Under normal operating conditions, external commercial power (350 in FIG. 3A) is supplied to the volatile memory device (220 and 220A) to maintain the data and to the non-volatile storage device (105) for normal operation by a host computer system power supply (101) and commercial power source (350).

According to the principles of the invention, in the event of commercial power source (350) loss, long-term data retention is maintained by using a rechargeable battery back up (301A and 301C) and control logic (305) to maintain power to both the volatile memory device (220 and 220A) and the non-volatile storage device (105) and transfer data from the volatile memory storage media (303) to the non-volatile storage device (105) through a back up and restore process.

In addition, according to the principles of the invention, the volatile memory device (220 and 220A) connects directly to a host expansion bus (309 and 309A) so that a high-speed data path is provided for moving information between the host computer system (360) and the volatile memory device (220 and 220A).

In one embodiment of the invention, the volatile memory storage media (303) is used for long-term data storage and is provided with continuous power, even when the host computer system (360) loses power or is turned off. When the host computer system (360) has power and is turned on, the data stored in the volatile memory storage media (303) of the volatile memory device of the invention (220 and 220A) are normally immediately available and accessible with data transfer rates significantly faster than prior art devices.

In one embodiment of the invention, data are then read and written to the volatile memory storage media (303) during the normal use of the host computer system (360) as if the volatile memory device of the invention (220 and 220A) were a disk drive. Consequently, the volatile memory device (220 and 220A) of the invention is used in the same manner that non-volatile storage devices, such as a disk drive, were used in the prior art. However, since, according to the invention, the long-term storage is performed by a volatile memory storage media (303), the data transfer rates are faster, reliability is increased and less operating power is consumed.

In one embodiment of the invention, the user may manually initialize a back up procedure at any time. Once initiated, the back up procedure transfers the entire contents of the volatile memory storage media (303) to a non-volatile storage device (105). When this process is finished, the data in the volatile memory storage media (303) are again available for normal use, and the back up data are unchanged. As discussed above, in one embodiment of the invention, the loss of commercial power (350) to the host computer system (360) will initiate an automatic back up from the volatile memory storage media (303) to the non-volatile storage device (105).

In one embodiment of the invention, upon the loss of commercial power (350), i.e., when the power at the outlet becomes unavailable, power will be provided seamlessly from a rechargeable battery system (301, 301C) coupled to the both volatile memory device (220 and 220A) and the non-volatile storage device (105). In addition, in one embodiment of the invention, an automatic back up from the volatile memory device (220 and 220A) to the non-volatile storage device (105) will be initiated, an alarm condition will be indicated, and the host computer system (360) will be shut down in an orderly manner.

In one embodiment of the invention, when commercial power (350) is restored to the host computer system (360) and the volatile memory device of the invention (220 and 220A), the volatile memory device of the invention (220 and 220A) will then automatically restore the data previously saved on the non-volatile storage device (105) to the volatile memory storage media (303). The data are then available for normal access.

As discussed in more detail below, the volatile memory devices (220 and 220A) of the invention are used by the host computer system (360) as the storage media and include a volatile memory device power supply (301 and 301C) to provide power to both the volatile memory device (220 and 220A) and non-volatile storage device (105) in the event of power failure. In addition, the volatile memory devices of the invention (220 and 220A) connect directly to a host expansion bus (309 and 309A) of the host computer system (360), such as a PCI bus. Consequently, the volatile memory devices of the invention (220 and 220A) are faster than prior art devices, use less power and are lower cost.

The volatile memory devices of the invention can be also readily used in existing standard computer system architectures that typically already include non-volatile storage devices (105). In one embodiment of the invention, existing local disk dives are used as the non-volatile storage device (105) that is backed up by the volatile memory device power supply (301, 301C) of the invention. Therefore, the volatile memory devices of the invention (220 and 220A) will significantly increase the speed and data transfer rate of long-term data storage in virtually any host computer system (360).

It will be apparent in the discussion that follows that the volatile memory devices of the invention (220 and 220A) are a low cost solution to the long-standing problem presented by slow data transfer rates of prior art storage devices.

Figure 2:
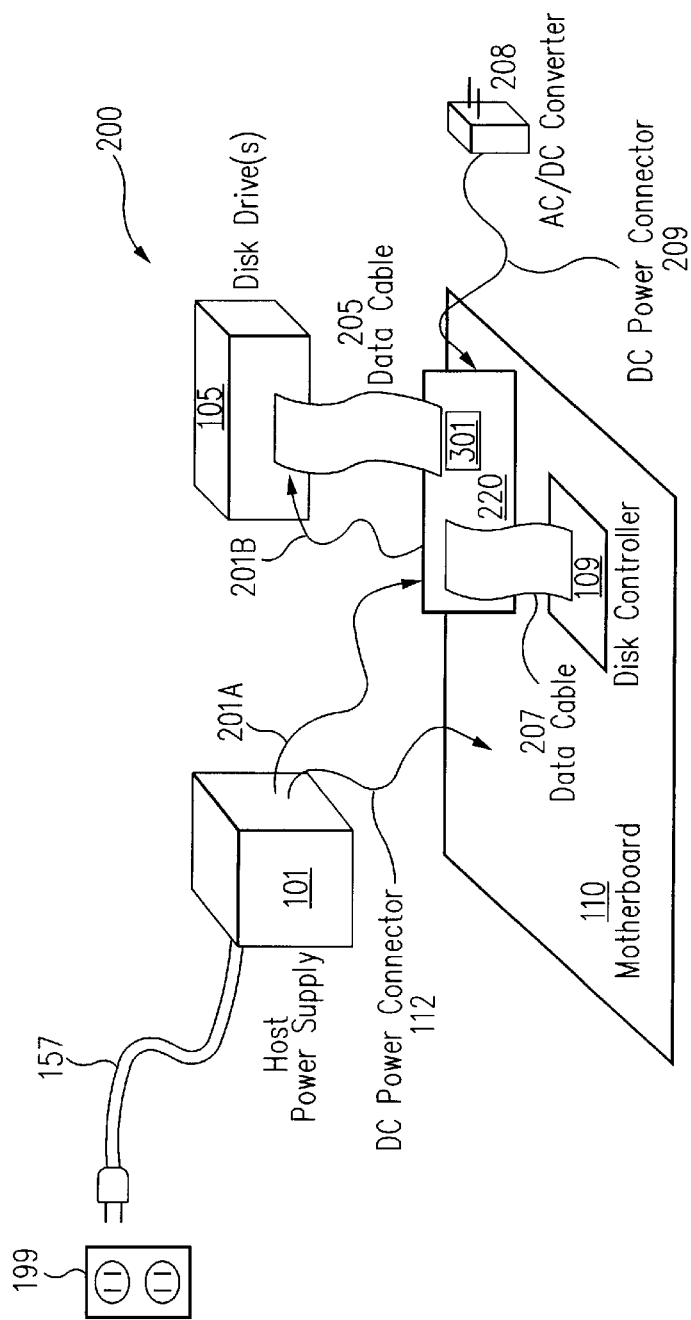
FIG. 2 shows one embodiment of a sub-system in accordance with the principles of the invention.

FIG. 2 shows a sub-system 200 in accordance with one embodiment of the invention. Sub-system 200 includes: motherboard 110; host computer system power supply 101; non-volatile storage device 105 with volatile memory device power supply 301; disk controller 109; volatile memory device 220; AC/DC converter 208; DC power connector 112, coupling power supply 101 to motherboard 110; DC power connector 201A, coupling power supply 101 to volatile memory device 220; DC power connector 201B, coupling volatile memory device 220 to non-volatile storage device 105; data cable 205 that facilitates the transfer of data between volatile memory device 220 and non-volatile storage device 105; data cable 207 that facilitates the transfer of data between non-volatile storage device 105 and disk controller 109 across volatile memory device 220; DC power connector 209, coupling AC/DC converter 208, and a commercial power source, to volatile memory device 220; and power connector 157 coupling host computer system power supply 101 to commercial power 199.

Figure 3A:
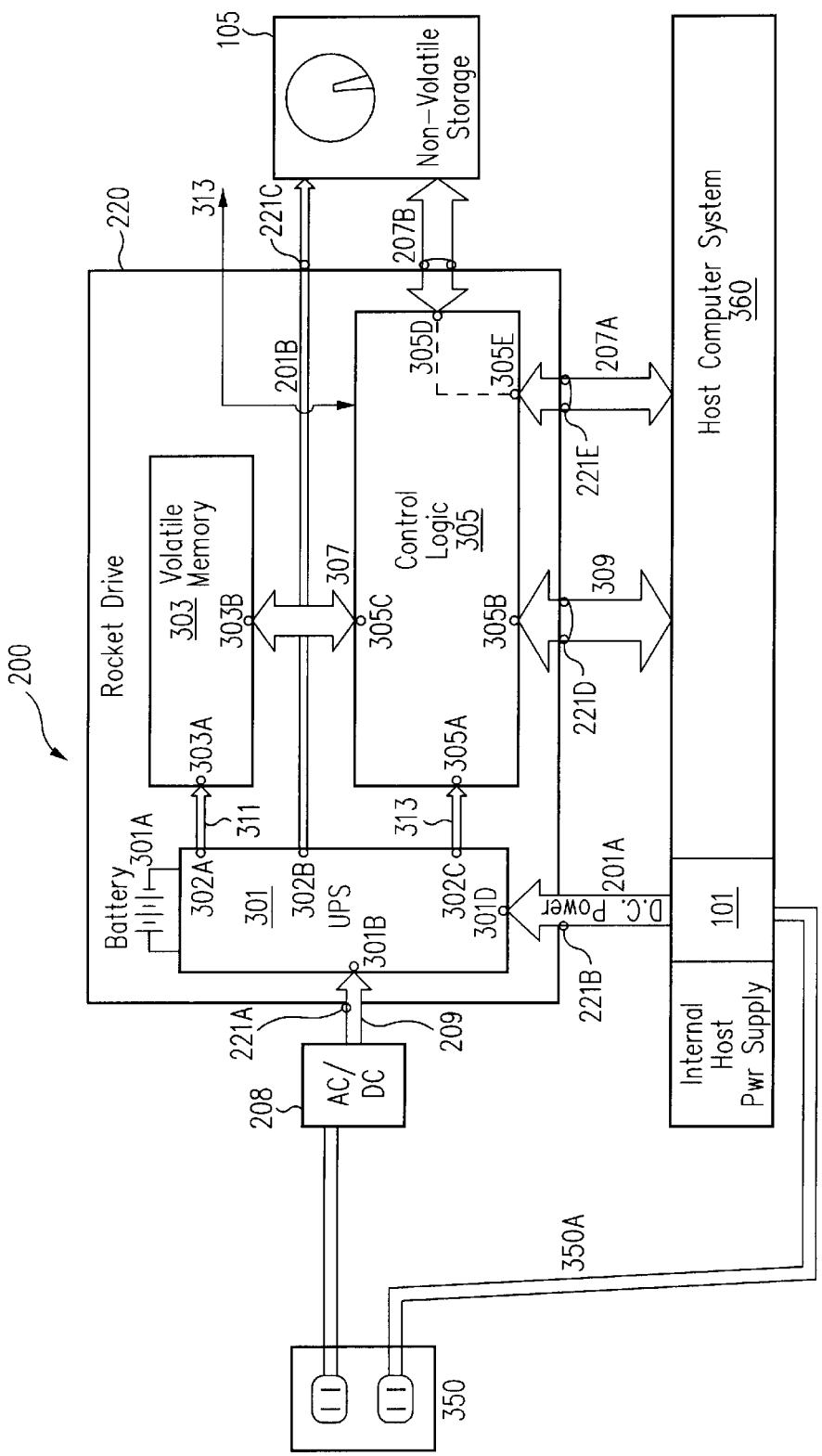
FIG. 3A shows a block diagram of one embodiment of a sub-system including detail of one embodiment of a volatile memory device in accordance with the principles of the invention.

FIG. 3A shows a block diagram of sub-system 200 including more detail of one embodiment of volatile memory device 220. As seen in FIG. 3A, in one embodiment of the invention, volatile memory device 220 includes: a volatile memory device power supply 301, in one embodiment a regulated or uninterruptible power supply, including rechargeable battery 301A; volatile memory storage media 303; and control logic 305 including discrete inputs/outputs 313.

As also seen in FIG. 3A, AC/DC converter 208 is coupled to commercial power source 350. AC/DC converter 208 converts AC power from commercial power source 350 to usable DC power. DC power is coupled from AC/DC converter 208 to volatile memory device 220 by DC power connector 209, at volatile memory device first power input terminal 221A, and volatile memory device power supply 301, at volatile memory device power supply first power input terminal 301B. DC power is also supplied to volatile memory device 220 by DC power connector 201A, at volatile memory device second power input terminal 221B, and volatile memory device power supply 301 by DC power connector 201A, at volatile memory device power supply second power input terminal 301D, from host computer system power supply 101 of host computer system 360. Host computer system power supply 101, in turn, is provided with commercial electrical power from commercial power source 350 via power connector 350A.

Power from volatile memory device power supply 301 is coupled to: volatile memory storage media 303, via DC power connector 311, from volatile memory device power supply first power output terminal 302A to volatile memory storage media power input terminal 303A; control logic 305, via DC power connector 313, from volatile memory device power supply third power output terminal 302C to control logic power input terminal 305A; and non-volatile storage device 105, via DC power connector 201B, from volatile memory device power supply second power output terminal 302B to volatile memory device power output terminal 221C and out to non-volatile storage device 105.

Host computer system 360 includes a host expansion bus 309, in one embodiment a PCI bus, which is coupled to volatile memory device expansion bus connector 221D that is, in turn, coupled to control logic first host connector 305B of control logic 305. In one embodiment of the invention, data cable 207A connects a host computer system peripheral bus (not shown), typically an IDE or SCSI bus, to volatile memory device peripheral bus connector 221E that, in turn, is coupled to control logic second host connector 305E of control logic 305. Control logic 305 routes data between host computer system 360 and non-volatile storage device 105, or from volatile memory storage media 303 to non-volatile storage device 105. In one embodiment of the invention, control logic 305 routes data between host computer system 360 and non-volatile storage device 105 via host computer system expansion bus 309.

In one embodiment of the invention, a control logic and data bus 307 connects volatile memory storage media data and control connector 303B of volatile memory storage media 303 to control logic data and volatile memory control connector 305C of control logic 305 and facilitates the transfer of control signals and data between control logic 305 and volatile memory storage media 303. In one embodiment of the invention, data are transferred between host computer system 360 via expansion bus 309, through control logic 305, to control logic and data bus 307, to volatile memory storage media 303.

As discussed above, according to the principles of the invention, volatile memory storage media 303 of volatile memory device 220 is used for long-term data storage by host computer system 360. In normal operation, i.e., when host computer system 360 has commercial power 350 and is turned on, the data stored in the volatile memory storage media 303 are immediately available and accessible and data are read and written to the volatile memory storage media 303. Thus, during the normal use of host computer system 360, volatile memory storage media 303 is used for long-term storage in the same manner that non-volatile storage devices were used in the prior art.

In one embodiment of the invention, when host computer system 360 is first turned on, control logic 305 communicates with non-volatile storage device 105 over data cable 207B that connects control logic data and non-volatile storage control connector 305D of control logic 305 to non-volatile storage device 105. Control logic 305 thereby directs non-volatile storage device 105 to assign and save a predetermined amount of non-volatile memory for backing up volatile memory storage media 303 in the event of power loss. The amount of non-volatile memory space reserved will vary from application to application. In one embodiment of the invention, enough space in non-volatile storage device 105 is reserved to accommodate the entire memory of volatile memory storage media 303. In one embodiment of the invention, the amount of space reserved in non-volatile storage device 105 is a predetermined amount and is the same with each start up. In other embodiments, the space in non-volatile storage device 105 reserved varies according to the content of volatile memory storage media 303 automatically.

According to the principles of the invention, the loss of commercial power 350 to host computer system 360 causes control logic 305 to initiate an automatic back up from volatile memory storage media 303 to the non-volatile storage device 105. In one embodiment of the invention, after the back up, non-volatile storage device 105 will continue to be available for normal operation.

According to the principles of the invention, when commercial power 350 is lost, and/or host computer system 360 power is not available, power will be provided seamlessly from rechargeable battery 301A of volatile memory device power supply 301 of volatile memory device 220. As shown in FIG. 3A, DC power from volatile memory device power supply 301 is coupled to both volatile memory storage media 303, via DC power connector 311, and non-volatile storage device 105, via DC power connector 201B.

In addition, according to the principles of the invention, when control logic 305 detects that volatile memory device power supply 301 is the only source of power, control logic 305 initiates an automatic back up from volatile memory storage media 303 to non-volatile storage device 105. In one embodiment of the invention, an alarm condition is then indicated, and volatile memory device 220 continues to operate as long as the voltage of rechargeable battery 301A remains above a predetermined level, in one embodiment, ten percent of full charge. Once the voltage of rechargeable battery 301A drops below the predetermined level, volatile memory device 220 is shut down in an orderly manner.

In one embodiment of the invention, when commercial power 350 is restored to volatile memory device 220, through DC power connector 209 and AC/DC converter 208, control logic 305 automatically restores the data previously saved to non-volatile storage device 105 back to volatile memory storage media 303. The data are then available for normal access by host computer system 360.

In addition to the automatic back up system described above, the user may manually initialize a back up procedure at any time. Once initiated, the back up procedure transfers the entire contents of volatile memory storage media 303 to non-volatile storage device 105, just as in the case of an automatic back up. When the manual back up is finished, the data in volatile memory storage media 303 are once again available for normal use, and the back up data are unchanged.

Figure 3B:
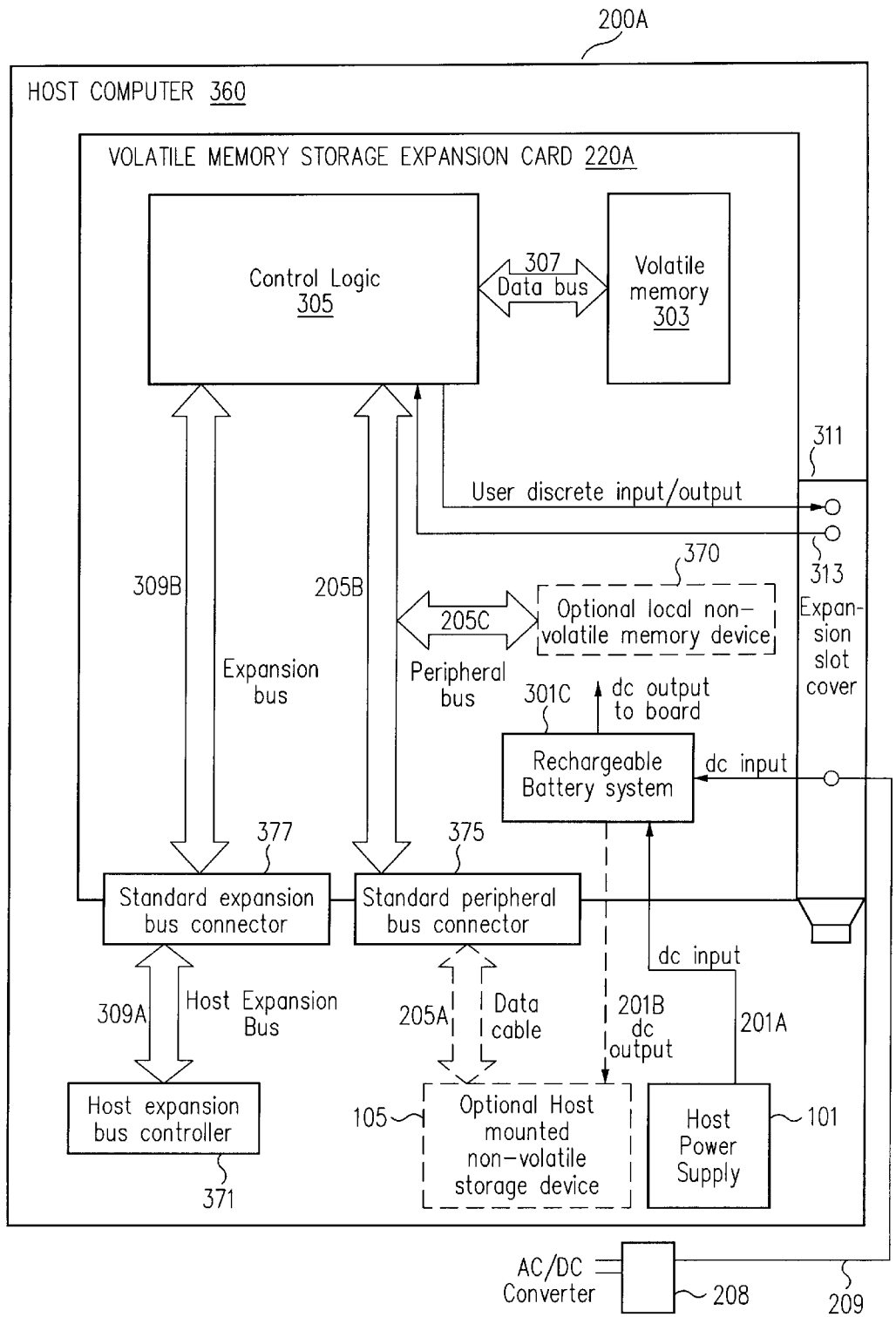
FIG. 3B is a block diagram of one embodiment of a volatile memory device internally mounted in a host computer system along with some of the components of one embodiment of a sub-system in accordance with the principles of the invention.

FIG. 3B is a block diagram of another embodiment of a sub-system 200A including a volatile memory device 220A that is internally mounted in host computer system 360 in accordance with the principles of the invention. FIG. 3B shows more detail of certain aspects of one embodiment of volatile memory device 220A as well as several optional features discussed in more detail below.

The internally mounted volatile memory device 220A embodiment of the invention shown in FIG. 3B includes: rechargeable battery system 301C; volatile memory storage media 303; control logic 305; optional local non-volatile storage device 370; expansion slot cover 311; user discrete input/output 313; standard expansion bus connector 377; standard peripheral bus connector 375; and AC/DC converter 208.

As also seen in FIG. 3B, DC power is coupled from AC/DC converter 208 to rechargeable battery system 301C by DC power connector 209. Rechargeable battery system 301C performs the function of volatile memory device power supply 301, and rechargeable battery 301A, discussed above with respect to FIG. 3A. DC power is supplied to rechargeable battery system 301C and volatile memory device 220A from host computer system power supply 101 of host computer system 360 by DC power connector 201A.

Embodiments of the invention where host computer system 360 is a portable system, such as a laptop, will also include an internal DC battery source (not shown) that is used to replace volatile memory device power supply 301 and rechargeable battery 301C. Host computer system 360 internal DC battery sources are connected in a manner similar to host computer system power supply 101 and provide similar power needs.

Power from rechargeable battery system 301C is coupled to volatile memory device 220A and then relayed, via electrical traces and card connections, to: volatile memory storage media 303 (connection not shown in FIG. 3B); control logic 305 (connection not shown in FIG. 3B); non-volatile storage device 105, via DC power connector 201B; and/or optional local non-volatile storage device 370 (connection not shown in FIG. 3B).

In the embodiment of the invention shown in FIG. 3B, host computer system 360 includes a host expansion bus controller 371 connected to a host expansion bus 309A. Host expansion bus 309A is connected to standard expansion bus connector 377. Standard expansion bus connector 377 is then connected to control logic 305 by volatile memory device expansion bus 309B.

In this embodiment of the invention, volatile memory device peripheral bus 205B connects control logic 305 to standard peripheral bus connector 375. Standard peripheral bus connector 375 is then connected to non-volatile storage device 105 by data cable 205A. Optional local non-volatile storage device 370 is also connected to volatile memory device peripheral bus 205B, and control logic 305, by extension 205C. In this embodiment of the invention, control logic and data bus 307 connects volatile memory storage media 303 to control logic 305.

The embodiment of sub-system 200A, and volatile memory device 220A, shown in FIG. 3B operates within host computer system 360 in essentially the same manner as discussed above with respect to FIG. 3A.

One embodiment of volatile memory device 220A is an internally mounted expansion card located in host computer system 360. In this embodiment, continuous DC power from AC/DC converter 208 is provided to rechargeable battery system 301C. Rechargeable battery system 301C then provides power to volatile memory device 220A, including volatile memory storage media 303 and non-volatile storage device 105 and/or optional local non-volatile storage device 370 in the event of a power failure.

Expansion slot cover 311 contains DC connections and discrete user input/output 313 for status indication and manual back up initiation as described above with respect to FIG. 3A. In addition, DC power from host computer system 360 is supplied to rechargeable battery system 301C, providing a second DC power source for volatile memory device 220A.

In the one embodiment of volatile memory device 220A, volatile memory device 220A is used to store data and is provided with continuous power, even when host computer system 360 is off. When host computer system 360 is turned on, the data stored in volatile memory device 220A are normally immediately available. Data are then read and written to volatile memory storage media 303 during the normal use of host computer system 360. At any time, the user may manually initialize a back up procedure that transfers the entire contents of volatile memory storage media 303 to non-volatile storage device 105 and/or optional local non-volatile storage device 370. When this process is finished, the data in volatile memory storage media 303 are again available for normal use, and the back up data are unchanged.

The loss of commercial power (not shown in FIG. 3B) causes control logic 305 to initiate an automatic back up from volatile memory storage media 303 to non-volatile storage device 105 and/or optional local non-volatile storage device 370.

Upon the loss of commercial power, power is provided seamlessly from rechargeable battery system 301C to volatile memory storage media 303 and non-volatile storage device 105 and/or optional local non-volatile storage device 370. In addition, control logic 305 initiates an automatic back up from volatile memory storage media 303 to non-volatile storage device 105 and/or optional local non-volatile storage device 370. In one embodiment, under these conditions, control logic 305 also causes an alarm condition to be indicated, and volatile memory device 220A is shut down by control logic 305 in an orderly manner.

When commercial power (not shown in FIG. 3B) is restored to volatile memory device 220A, volatile memory device 220A automatically restores the data previously saved from non-volatile storage device 105 and/or optional local non-volatile storage device 370 to volatile memory storage media 303. The data are then available for normal access.

The automatic and/or manual back up and restore system and procedure employed with volatile memory devices 220 and 220A of the invention, as discussed above, is used to back up the data stored in volatile memory storage media 303 to optional local non-volatile storage device 370 or host mounted non-volatile storage device 105 in the event of power loss. This automatic and/or manual back up and restore system and procedure is provided in the firmware of control logic 305. The design and operation of such firmware is well known to those of skill in the art and therefore will not be discussed in detail herein to avoid detracting from the invention.

As discussed above, in one embodiment of volatile memory device 220 or 220A according to the invention, a circuit (not shown) is provided in control logic 305 that detects when rechargeable battery 301A of volatile memory device power supply 301, or the battery of rechargeable battery system 301C, has dropped below ten percent of maximum capacity. According to the principles of this embodiment of the invention, when the charge remaining in rechargeable battery 301A, or rechargeable battery system 301C, falls below ten percent of maximum capacity, a complete and orderly shutdown of volatile memory device 220 or 220A is initiated.

As discussed in more detail below, one embodiment of volatile memory device 220 or 220A is a PCI plug in card that is fully PCI 2.1 compliant with a burst data transfer rate of 132 MB/sec. Another embodiment of volatile memory device 220 or 220A is a PCI 2.2 compliant version with a burst data transfer rate of 528 MB/sec. Yet another embodiment of volatile memory device 220 or 220A is a PCI-X compliant version with a burst data transfer rate of 1 GB/sec.

One embodiment of volatile memory device 220 or 220A reports to the computer via the PCI bus as a SCSI controller with one fixed disk attached. Another embodiment of volatile memory device 220 or 220A reports to host computer system 360 as an ATA/IDE controller with one fixed disk attached. One embodiment of volatile memory device 220 or 220A uses industry standard Dual Inline Memory Modules (DIMMs), of the same type as used in the host computer system 360 main memory (not shown).

One embodiment of volatile memory device 220 or 220A interfaces with the existing SCSI or Integrated Disk Electronics (IDE) hard drive in host computer system 360 for back up. One embodiment of volatile memory device 220 or 220A provides DC power to the host computer system 360's existing SCSI or IDE hard disk.

One embodiment of volatile memory device 220 or 220A has an external DC input connection. One embodiment of volatile memory device 220 or 220A has discrete user I/O 313 in the form of two LED's, a buzzer and a switch to provide status information and a means to initiate a manual back up of the stored data.

One embodiment of volatile memory device 220 or 220A has an access time of 90 ns and I/O's per second of 6,000,000. One embodiment of volatile memory device 220 or 220A has a capacity of four Gigabytes (GB).

One embodiment of volatile memory device 220 or 220A has a burst data rate of 132 MB/s and a sustained data rate of 60 MB/s.

One embodiment of volatile memory device 220 or 220A is approximately 0.9 inches thick by approximately 4 inches high by approximately 7 inches long and weighs approximately 1 pound.

Figure 4A:
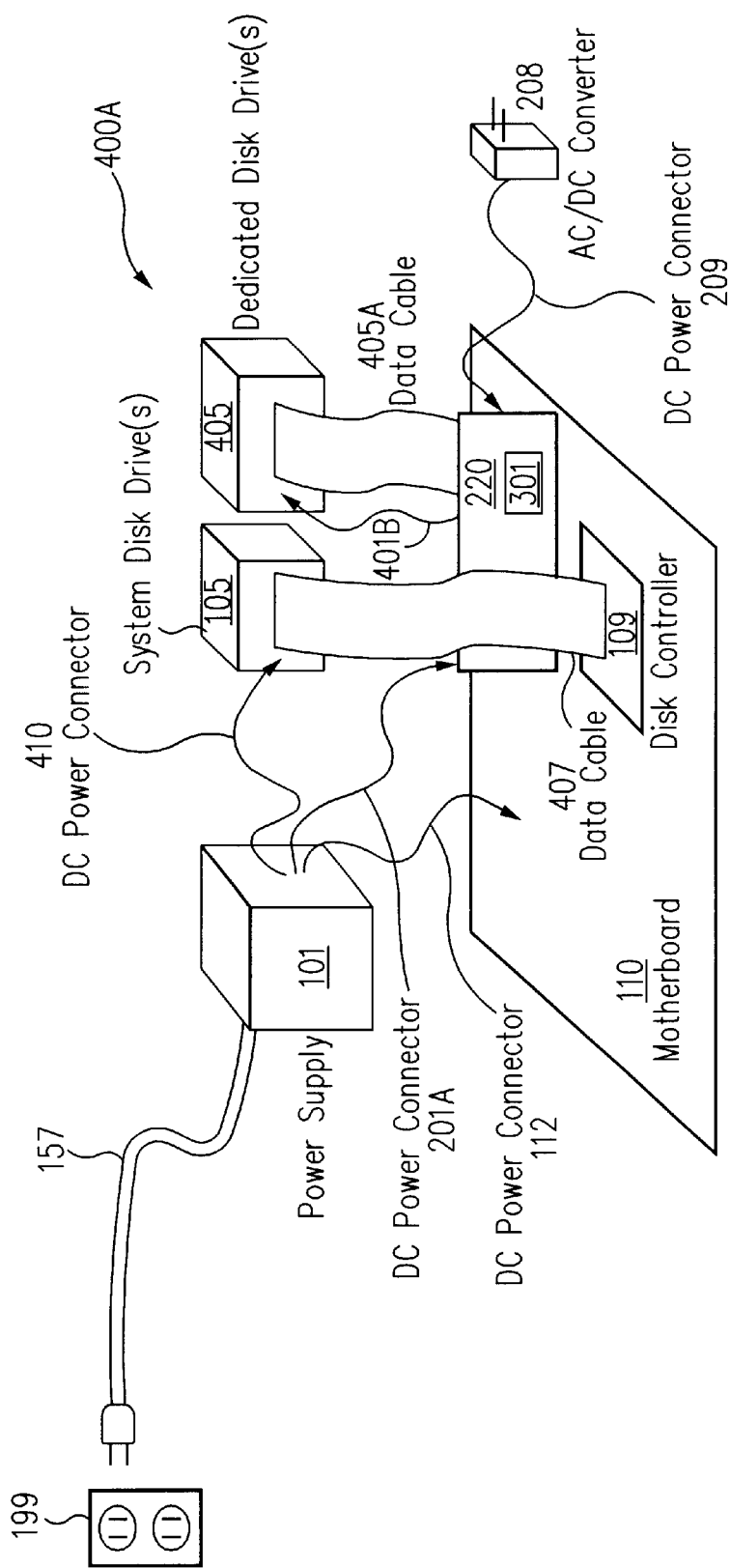
FIG. 4A shows an alternative embodiment of a sub-system incorporating an internally mounted volatile memory device in accordance with the principles of the invention.

FIG. 4A shows an alternative embodiment of a sub-system 400A incorporating an internally mounted volatile memory device, such as volatile memory device 220 of FIG. 3A or 220A of FIG. 3B, in accordance with the principles of the invention. Sub-system 400A, like sub-system 200 discussed above, includes: motherboard 110; host computer system power supply 101; non-volatile storage device 105; disk controller 109; volatile memory device 220 or 220A with volatile memory device power supply 301; AC/DC converter 208; DC power connector 112, coupling power supply 101 to motherboard 110; DC power connector 201A, coupling power supply 101 to volatile memory device 220 or 220A; DC power connector 209, coupling AC/DC converter 208, and a commercial power source, to volatile memory device 220 or 220A; and power connector 157 coupling power supply 101 to commercial power source 199.

In addition, sub-system 400A includes dedicated non-volatile storage device 405, typically an additional disk drive, and DC power connector 410, coupling power from host computer system power supply 101 to non-volatile storage device 105.

In this embodiment of a sub-system according to the invention, data cable 407 facilitates the transfer of data between disk controller 109 and non-volatile storage device 105. Also, DC power connector 401B couples volatile memory device 220 or 220A to dedicated non-volatile storage device 405. Data cable 405A is coupled between volatile memory device 220 or 220A and dedicated non-volatile storage device 405 to facilitate the transfer of data between volatile memory device 220 or 220A and dedicated non-volatile storage device 405.

In the embodiment of a sub-system 400A shown in FIG. 4A, host computer system non-volatile storage device 105 does not need to be coupled to volatile memory device 220 or 220A. In this embodiment, volatile memory device 220 or 220A provides volatile memory operations with independent dedicated non-volatile storage device 405 back up for motherboard 110.

Figure 4B:
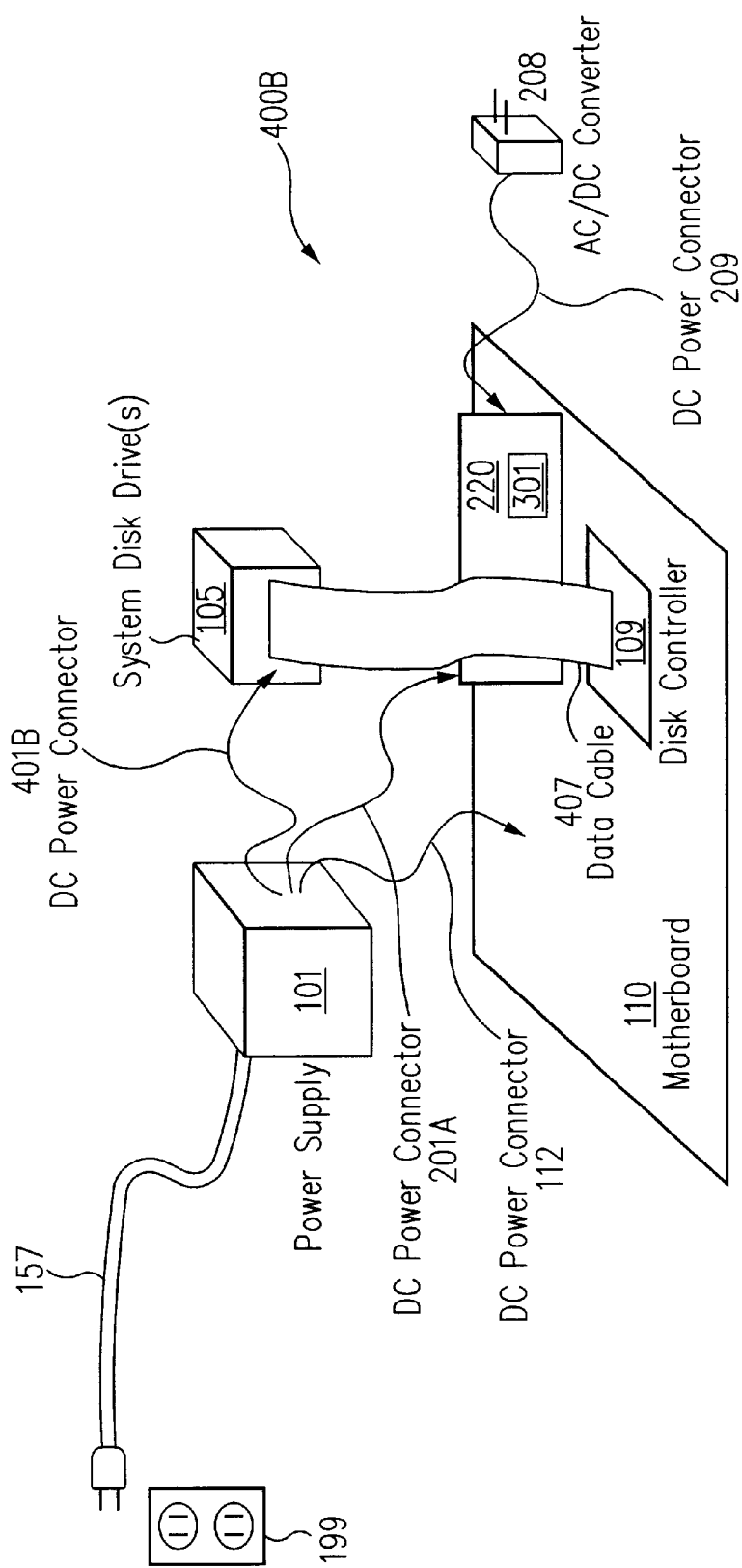
FIG. 4B shows an alternative embodiment of a sub-system incorporating an internally mounted volatile memory device in accordance with the principles of the invention.

FIG. 4B shows another alternative embodiment of a sub-system 400B incorporating an internally mounted volatile memory device 220 or 220A in accordance with the principles of the invention. Sub-system 400B, like sub-system 200 and sub-system 400A discussed above, includes: motherboard 110; host computer system power supply 101; non-volatile storage device 105; disk controller 109; volatile memory device 220 or 220A with volatile memory device power supply 301; AC/DC converter 208; DC power connector 112, coupling power supply 101 to motherboard 110; DC power connector 201A, coupling power supply 101 to volatile memory device 220 or 220A; DC power connector 209, coupling AC/DC converter 208, and a commercial power source, to volatile memory device 220 or 220A; and power connector 157 coupling power supply 101 to commercial power source 199.

In this embodiment of a sub-system 400B according to the invention, data cable 407 facilitates the transfer of data between disk controller 109 and non-volatile storage device 105 and DC power connector 410B couples power from power supply 101 to non-volatile storage device 105.

In the embodiment of a sub-system 400B shown in FIG. 4B, the host computer system non-volatile storage device 105 does not need to be coupled to volatile memory device 220 or 220A at all. In this embodiment, volatile memory device 220 or 220A provides volatile memory operations with independent power to motherboard 110.

Figure 5:
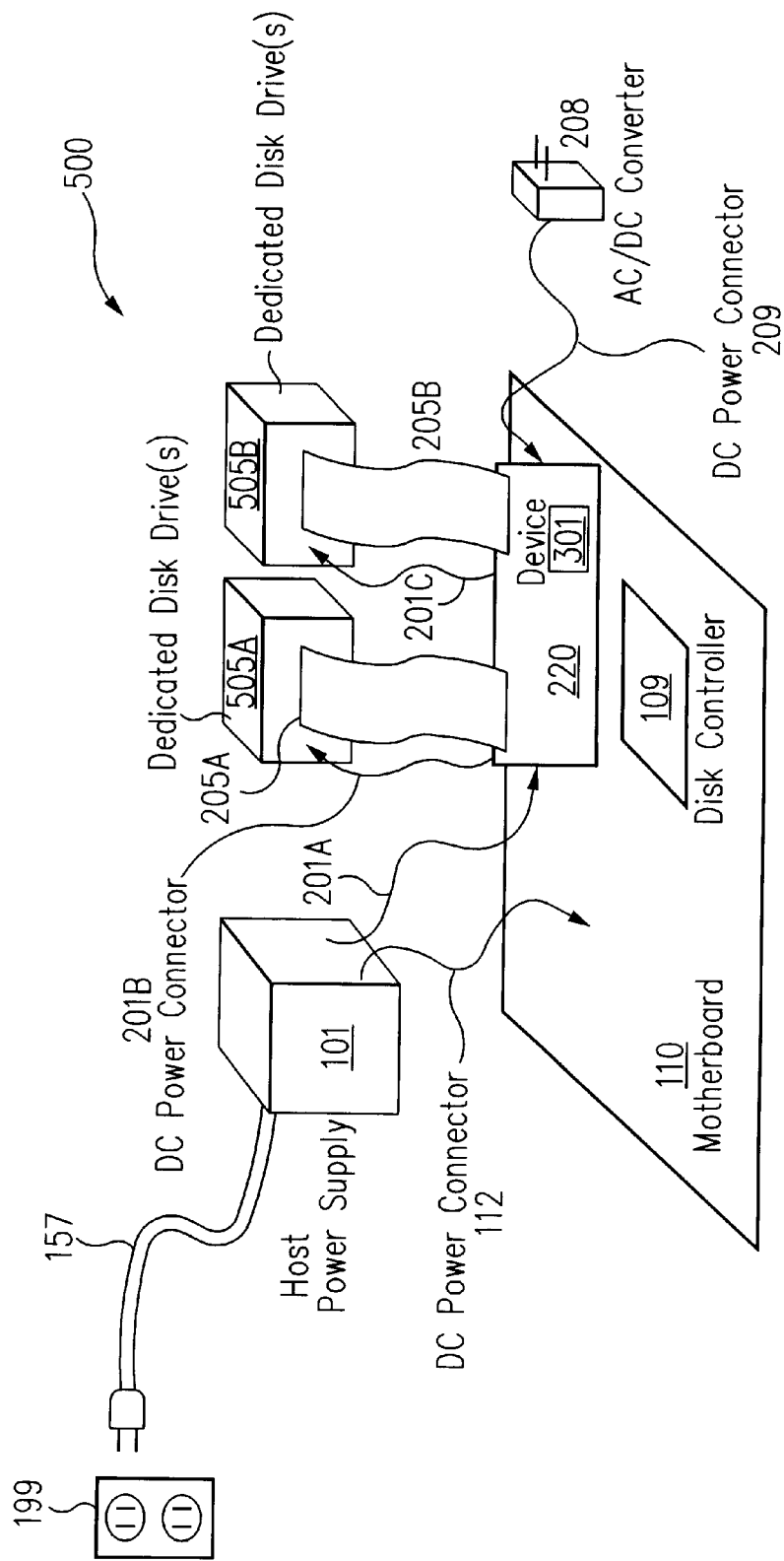
FIG. 5 shows an embodiment of a memory and disk sub-system in accordance with the principles of the invention.

FIG. 5 shows an embodiment of a sub-system 500 in accordance with the principles of the invention. Sub-system 500 incorporates an internally mounted volatile memory device 220 or 220A in accordance with the principles of the invention. Sub-system 500, like sub-system 200, sub-system 400A and sub-system 400B discussed above, includes: motherboard 110; host computer system power supply 101; disk controller 109; volatile memory device 220 or 220A with volatile memory device power supply 301; AC/DC converter 208; DC power connector 112, coupling power supply 101 to motherboard 110; DC power connector 201A, coupling power supply 101 to volatile memory device 220 or 220A; DC power connector 209, coupling AC/DC converter 208, and a commercial power source, to volatile memory device 220 or 220A; power connector 157 coupling power supply 101 to commercial power source 199; non-volatile storage devices 505A and 505B; DC power connectors 201B and 201C, connecting DC power from volatile memory device 220 or 220A to non-volatile storage devices 505A and 505B, respectively; and data cables 205A and 205B connected to non-volatile storage devices 505A and 505B to facilitate the transfer of data between disk controller 109 and non-volatile storage devices 505A and 505B, respectively, across non-volatile memory device 220 or 220A.

In one embodiment of a sub-system 500 according to the invention, non-volatile storage devices 505A and 505B are dedicated disk drives attached to volatile memory device 220 or 220A. In this embodiment, volatile memory device 220 or 220A manages data flow between host computer system 360, non-volatile storage device(s) 505A and 505B, and volatile memory storage media 303 (see FIG. 3A) on volatile memory device 220 or 220A. Volatile memory device 220 or 220A also supplies DC battery back up power to itself and multiple non-volatile storage devices 505A and 505B via volatile memory device power supply 301. In this embodiment of the invention, in the event of power failure, the data stored in volatile memory storage media 303 on volatile memory device 220 or 220A are backed up to the attached non-volatile storage devices 505A and 505B.

As discussed above, according to the principles of the present invention, sub-systems 200, 200A, 400A, 400B and 500 with volatile memory devices 220 and 220A are provided that are used by the host computer system as the storage media, i.e., they are used as if it were a disk drive.

The volatile memory devices of the invention include an integrated controller and volatile memory storage media.

The volatile memory devices of the invention include volatile memory device back up systems to provide power to both the volatile memory and non-volatile memory in the event of power failure. In one embodiment of the invention, the non-volatile memory that is backed up by the volatile memory device power supply of the invention is a local disk normally available to the host computer system. Consequently, the volatile memory devices of the present invention provide long-term data storage capability without the risks associated with prior art devices.

In addition, the volatile memory devices of the invention connect directly to an expansion bus of the host computer system, such as a PCI bus. Therefore, the volatile memory devices of the invention include a high-speed path to the host computer system. Consequently, the volatile memory devices of the invention are faster than prior art devices, use less power and are lower cost.

The volatile memory devices of the invention can also be readily used in existing standard computer system architectures that typically already include both volatile and non-volatile storage devices. In one embodiment of the invention, existing local disk dives are used as the non-volatile storage device that is backed up by the volatile memory device power supply of the invention. Therefore, the volatile memory devices of the invention will significantly increase the speed and data transfer rate of long-term data storage in virtually any host computer system.

It should be apparent from the discussion above that the volatile memory devices of the invention are a low cost solution to the long-standing problem presented by slow data transfer rates of prior art storage devices.

Figure 6A:
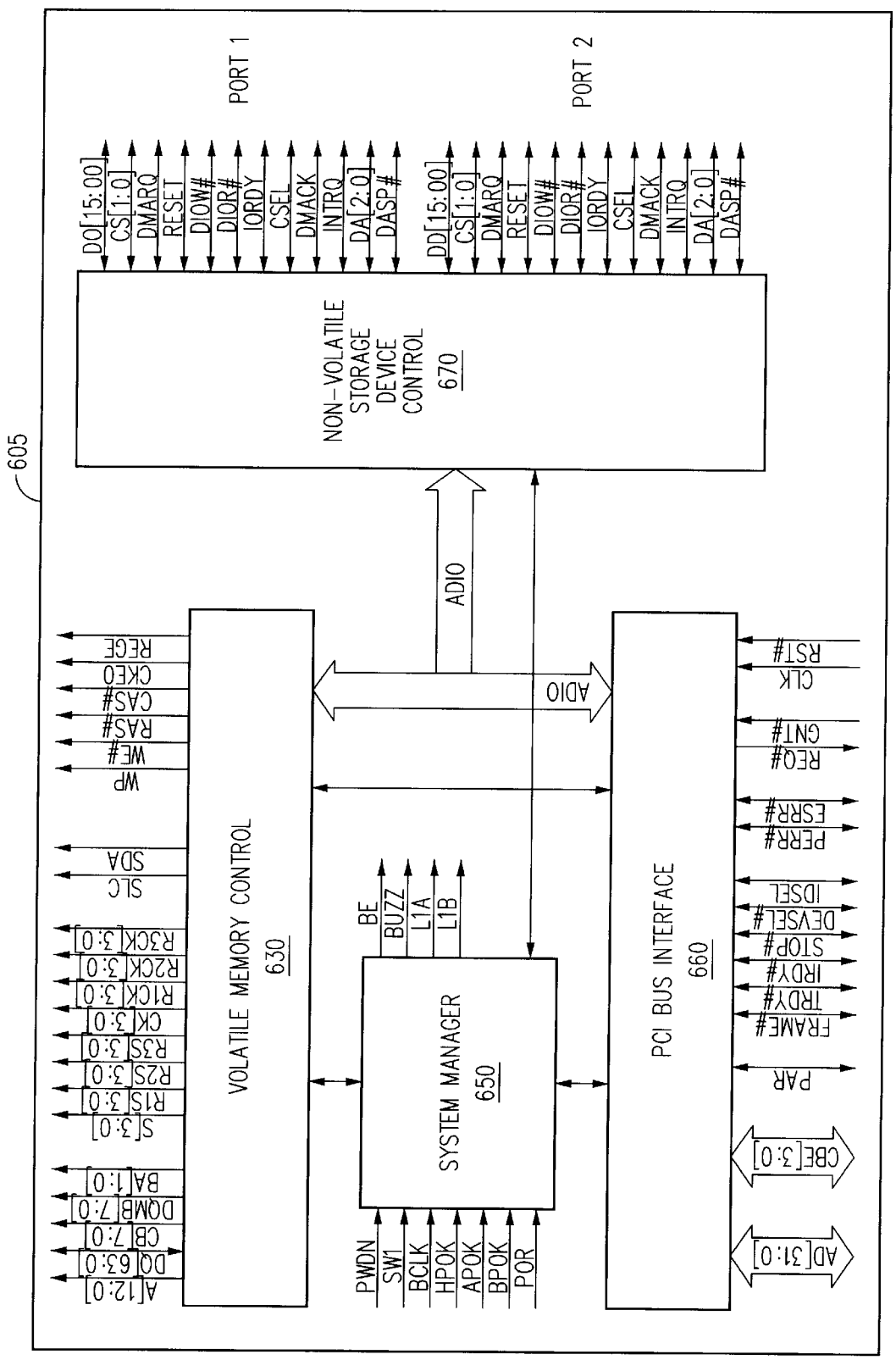
FIG. 6A is a block diagram of one embodiment of a control logic chip suitable for use with the present invention.

FIG. 6A shows a block diagram of one embodiment of a control logic chip 605 suitable for use with the present invention. Control logic chip 605 represents just one embodiment of control logic 305 of FIGS. 3A and 3B discussed above. Those of skill in the art will readily recognize that numerous other control logic chips can perform the functions of control logic 305 and that the one embodiment 605 is discussed below as simply one example.

In one embodiment, control logic chip 605 is an integrated circuit chip, which is used with volatile memory devices 220 and 220A in an expansion bus, such as a PCI bus, environment. The design is implemented using an FPGA configured, as discussed below, to perform all functions described above with respect to control logic 305.

As discussed above, volatile memory devices 220 and 220A provide high-speed data storage for wide-bandwidth host computing systems and require control logic 305 to manage expansion bus data interchange with volatile memory storage media 303. A second requirement of control logic 305 is supporting "On-Now" operation by managing an on-board UPS system and correctly responding to Power Management Event (PME) signals generated by host computer system 360. Lastly, control logic 305 provides for automated back up of the data in volatile memory storage media 303 to non-volatile storage devices 105 and 370 through a peripheral port, such as an IDE or SCSI port.

For the remainder of this discussion, control logic chip 605 will be discussed with respect to sub-system 200 of FIG. 3A. The choice of sub-system 200 of FIG. 3A is made for simplicity and to avoid detracting from the invention by describing several embodiments of the invention in one place. Those of skill in the art will recognize that, with minimal or no modification, the discussion below applies to all the embodiments of the invention.

To implement the control logic 305 functions, one embodiment of control logic chip 605 operates in a double-word, i.e., 32 bit, data transfer mode at a typical clock speed of 33 MHz. In one embodiment, control logic chip 605 appears on the host expansion bus 309 as a target device with bus master capability and with a fixed configuration. As shown in FIG. 6A, the logical structure of control logic chip 605 is grouped in the following subsystems: system manager 650; PCI bus interface 660; volatile memory control 630; and non-volatile storage device control 670.

One embodiment of control logic chip 605 is fabricated using an industry standard FPGA, such as a Xilinx™ Spartan™-II series FPGA, and is packaged in a BGA package. Control logic chip 605 is typically operated at 2.5 V and all inputs and outputs can be configured to be LVTTL compatible.

One embodiment of control logic chip 605 operates on a 32-bit wide bus at 33 MHz and supports burst transfers at rates up to 132 MB/s with robust "HotPlug" and "On-Now" support. One embodiment also includes interactive audible and visual alarm with recovery.

Figure 6B:
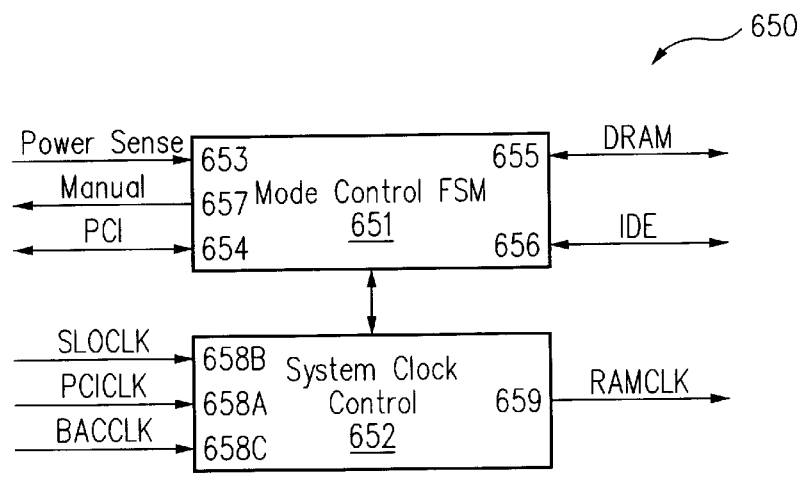
FIG. 6B is a block diagram of one embodiment of the system manager sub-system of the control logic chip of FIG. 6A in accordance with the principles of the invention.

System manager 650 monitors and controls the over all operation of control logic chip 605. FIG. 6B shows a block diagram of system manager 650 with more detail including: mode control Finite State Machine (FSM) 651; system clock control 652; power sense terminal 653; PCI terminal 654; volatile memory terminal 655; non-volatile memory terminal 656; manual input terminal 657; PCI clock terminal 658A; slow clock terminal 658B; back up clock terminal 658C; and volatile memory clock terminal 659.

Figure 6C:
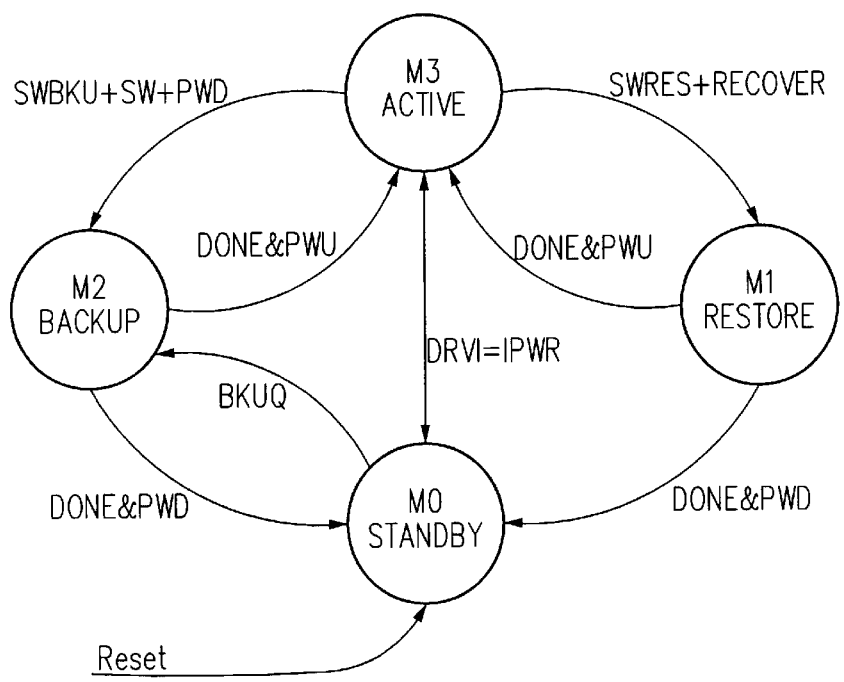
FIG. 6C is an illustration of the interaction and control of the modes by the mode control Finite State Machine (FSM) in the system manager sub-system of FIG. 6B.

System manager 650 operates in one of four modes: active mode M3; back up mode M2; restore mode M1, and standby mode M0. The modes of system manager 650 are controlled by mode control FSM 651 as shown in FIG. 6B. FIG. 6C is an illustration of the interaction and control of the modes of system manager 650 by mode control FSM 651.

Active mode M3 is the normal operating mode in which control logic chip 605 provides volatile memory storage media 303 storage to host computer system 360 through host expansion bus 309 (see FIG. 3A). In active mode M3, control logic chip 605 continuously monitors host computer system 360 power, peripheral bus 207A and 207B, and volatile memory device 220 power status to control the operating mode.

In back up mode M2 (FIG. 6C), control logic chip 605 ceases providing storage services to host expansion bus 309 and transfers data from volatile memory storage media 303 to non-volatile storage device 105 through peripheral bus 207A/B.

In restore mode M1, the contents of volatile memory storage media 303 are replaced with data retrieved from non-volatile storage device 105.

Standby mode M0 maintains power to volatile memory storage media 303 to retain data but no transfers are possible. In standby mode M0, control logic chip 605 clock (not shown) is slowed to conserve power. Standby mode M0 is sustained by either AC/DC converter 208 or by volatile memory device power supply 301, and rechargeable battery 301A, down to a minimum reserve limit, typically ten percent of maximum capacity.

In one embodiment of the invention, control logic chip 605 can be further forced into an inactive standby mode by an external control (not shown) and methods well known to those of skill in the art. This is a non-functioning mode wherein the configuration of the control logic chip 605 is maintained but no logic operations are possible.

Mode control FSM 651 is initialized at reset to standby mode M0 operating on a slow clock (not shown). Mode control FSM 651 monitors the IDE connections at IDE terminal 656 (FIG. 6B) noting changes in hardware configuration by setting a status flag when an interruption is detected, along with audible (one beep) and visual alarms. In one embodiment, depressing the Mute/Recover switch briefly cancels the audible beep while depressing the switch longer switches the clock (not shown) to the higher active frequency, and initiates appropriate recovery action.

When the peripheral bus 207A/207B (FIG. 3A) is under active control by the device and is in recovery mode, the recovery consists of detecting, activating and interrogating the IDE port to determine if there is a copy of the contents of volatile memory storage media 303 on a non-volatile storage device 105. If one non-volatile storage device 105 is found with the volatile memory storage media 303 data, the data are restored. If no non-volatile storage device 105 contains the volatile memory storage media 303 data, the contents of volatile memory storage media 303 are left unformatted and are available for the user to format, as in the case of a blank disk.

When host computer system 360 power is initiated, as indicated by the de-assertion of the power-down input (FIG. 6A), mode control FSM 651 switches system manager 650 and control logic chip 605 to active mode M3 (FIG. 6B).

In restore mode M1 operations, with the restore command asserted, control logic chip 605: disconnects the IDE port bridge; checks for a file, designated a RDC file, on non-volatile storage device 105; and restores the data to volatile memory storage media 303.

In back up mode M2, with the back up command asserted, control logic chip 605: disconnects the IDE port bridge from host computer system 360 (FIG. 3A); checks for an RDC file on non-volatile storage device 105; and restores the data in volatile memory storage media 303.

Figure 6D:
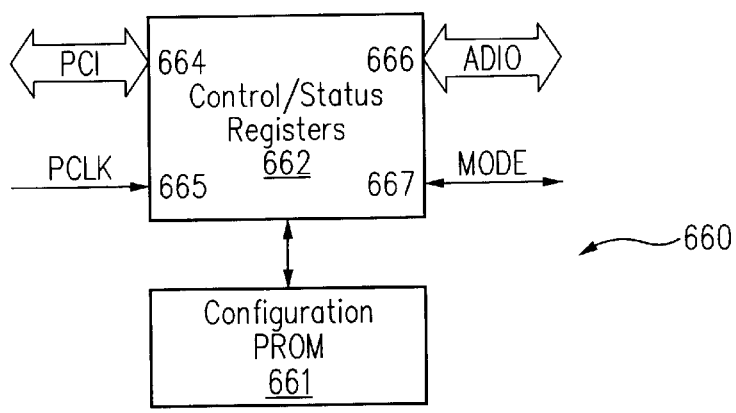
FIG. 6D is a block diagram of one embodiment of a PCI bus interface sub-system of the control logic chip of FIG. 6A in accordance with the principles of the invention.

FIG. 6D is a block diagram of PCI bus interface 660 of control logic chip 605. As shown in FIG. 6D, PCI bus interface 660 includes: control/status registers 662; Configuration PROM block 661; PCI terminal 664; PCLK terminal 665; mode terminal 667; and ADIO terminal 666.

PCI bus interface 660 handles the transactions between control logic chip 605 and all other devices over host expansion bus 309 (FIG. 3A). The design and operation of PCI bus interfaces, such as PCI bus interface 660, is well known to those of skill in the art and therefore will not be discussed in detail herein to avoid detracting from the invention.

Figure 6E:
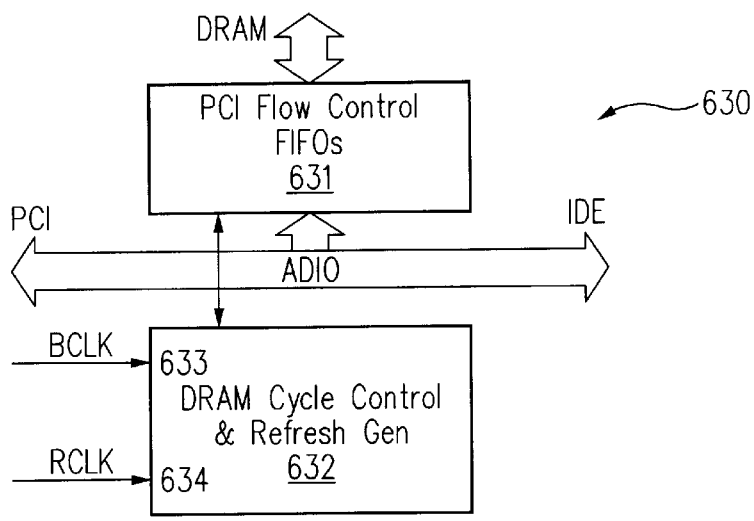
FIG. 6E is a block diagram of one embodiment of a volatile memory control of the control logic chip of FIG. 6A in accordance with the principles of the invention.

FIG. 6E is a block diagram of volatile memory control 630 of control logic chip 605. As shown in FIG. 6E, volatile memory control 630 includes: PCI flow control FIFO's 631; DRAM cycle control and refresh generator 632; BCLK terminal 633; and RCLK terminal 634.

The design and operation of volatile memory controls, such as volatile memory control 630, is well known to those of skill in the art and therefore will not be discussed in detail herein to avoid detracting from the invention.

Figure 6F:
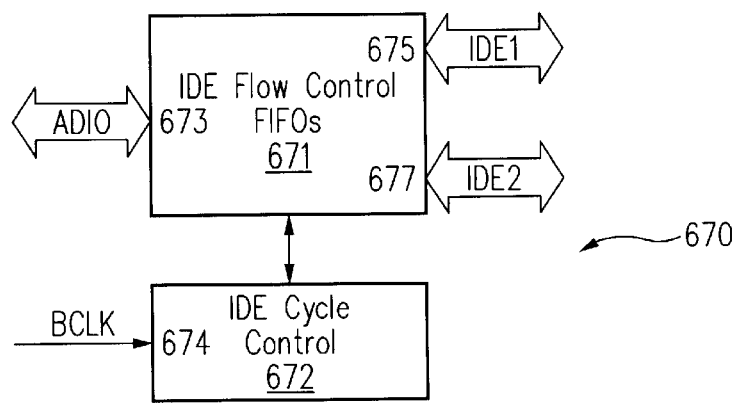
FIG. 6F is a block diagram of one embodiment of a non-volatile storage device control sub-system of the control logic chip of FIG. 6A in accordance with the principles of the invention.

FIG. 6F is a block diagram of non-volatile storage device control 670 of control logic chip 605. As shown in FIG. 6E, non-volatile storage device control 670 includes: IDE flow control FIFO's 671; IDE cycle control 672; ADIO terminal 673; IDE 1 terminal 675; IDE 2 terminal 677 and BCLK terminal 674.

The design and operation of non-volatile storage device controls, such as non-volatile storage device control 670, is well known to those of skill in the art and therefore will not be discussed in detail herein to avoid detracting from the invention.

As discussed above, according to the principles of the present invention, volatile memory devices are provided that are used by the host computer system as the storage media, i.e., they are used as if they were a disk drive.

The volatile memory devices of the invention include volatile memory device back up systems to provide power to both the volatile memory and non-volatile memory in the event of power failure. In one embodiment of the invention, the non-volatile memory that is backed up by the volatile memory device power supply of the invention is a local disk normally available to the host computer system. Consequently, the volatile memory devices of the present invention provide long-term data storage capability without the risks associated with prior art devices.

In addition, the volatile memory devices of the invention connect directly to an expansion bus of the host computer system, such as a PCI bus. Therefore, the volatile memory devices of the invention include a high-speed path to the host computer system. Consequently, the volatile memory devices of the invention are faster than prior art devices, use less power and are lower cost.

According to the principles of the invention, a computer system includes at least one volatile memory device and at least one non-volatile storage device. Under normal operating conditions, external commercial power is supplied to the volatile memory device to maintain the data and to the non-volatile storage device for normal operation by a host computer system power supply and commercial power source.

According to the principles of the invention, in the event of commercial power source loss, long-term data retention is maintained by using a battery back up and control logic to maintain power to both the volatile memory device and the non-volatile storage device and transfer data from the volatile memory device to the non-volatile storage device through a back up and restore process.

In addition, according to the principles of the invention, the volatile memory device connects directly to a host computer system expansion bus so that a high-speed data path is provided for moving information between the host computer system and the volatile memory device.

In one embodiment of the invention, the volatile memory is used for long-term data storage and is provided with continuous power, even when the host computer system loses power or is turned off. When the host computer system has power and is turned on, the data stored in the volatile memory device of the invention are normally immediately available and accessible with data transfer rates significantly faster than prior art storage devices.

In one embodiment of the invention, data are then read and written to the volatile memory device during the normal use of the host computer system as if the volatile memory device of the invention were a disk in a disk drive. Consequently, the volatile memory device of the invention is used in the same manner that non-volatile storage devices, such as a disk drive, were used in the prior art. However, since, according to the invention, the long-term storage is performed by a volatile memory device, the data transfer rates are faster, reliability is increased and less operating power is consumed.

The volatile memory devices of the invention can also be readily used in existing standard computer system architectures that typically already include both volatile and non-volatile storage devices. In one embodiment of the invention, existing local disk dives are used as the non-volatile storage device that is backed up by the volatile memory device power supply of the invention. Therefore, total system cost is reduced while also assuring data integrity.

The foregoing description of implementations of the invention have been presented for purposes of illustration and description, and therefore are not exhaustive and do not limit the invention to the precise forms disclosed. Modifications and variations are possible in light of the above teachings or may be acquired from practicing the invention.

For instance, in the discussion above, a desktop system was used as an example for simplicity and to avoid detracting from the invention by describing several similar embodiments at one time. However, those of skill in the art will recognize that the methods and structure of the invention can be readily applied to portable systems such as laptop systems, hand held systems, or virtually any size system, with minor modifications.

Consequently, The scope of the invention is defined by the claims and their equivalents.

What is claimed is:

1. A method for using volatile memory for data storage in a host computer system, said method comprising:
   providing a computer sub-system comprising:
      a host computer system power supply coupled to a power source;
      a host computer system expansion bus;
      a host computer system peripheral bus;
      a host computer system first non-volatile storage device;
      an AC/DC converter coupled to a power source; and
   a volatile memory device, said volatile memory device comprising:
      a volatile memory device power supply;
      volatile memory storage media;
   a volatile memory device power output terminal;
      control logic; and
      a volatile memory device expansion bus connector, wherein;
      said volatile memory device expansion bus connector connects said volatile memory device to said host computer system expansion bus, further wherein;
   said volatile memory device power supply of said volatile memory device is coupled to both said volatile memory storage media and said volatile memory device power output terminal, further wherein;
   said volatile memory device power output terminal is coupled to said host computer system first non-volatile storage device, whereby;
   said volatile memory device power supply provides power to both said volatile memory storage media and said host computer system first non-volatile storage device in the event of power loss to said host computer system, further wherein;
      said volatile memory device power supply of said volatile memory device is coupled to both said AC/DC converter and said host computer system power supply, further wherein;
      in the event of power loss to said host computer system power supply, said control logic causes data in said volatile memory storage media to be backed up to said host computer system first non-volatile storage device; and
   providing a host computer system second non-volatile storage device wherein;
   said volatile memory device power output terminal is coupled to both said host computer system first non-volatile storage device and said host computer system second non-volatile storage device, whereby;
   said volatile memory device power supply provides power to said volatile memory storage media and both said host computer system first non-volatile storage device and said host computer system second non-volatile storage device in the event of power loss to said host computer system.

* * * * *